Dec. 18, 1945.   W. J. EVANS   2,391,302
MEANS FOR FIXING PULLEYS AND THE LIKE TO SHAFTS
Filed April 10, 1943   2 Sheets-Sheet 1
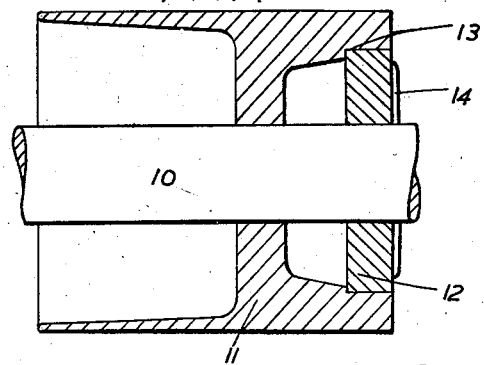
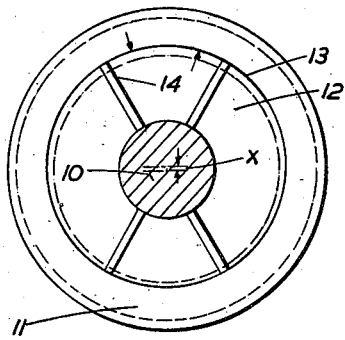
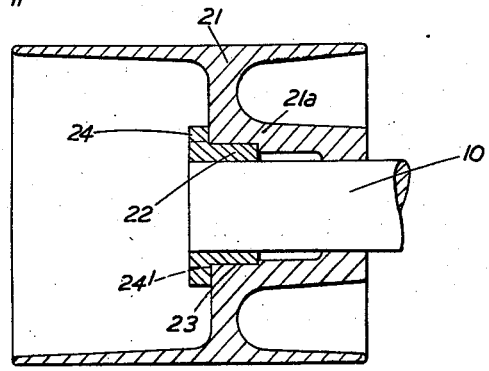
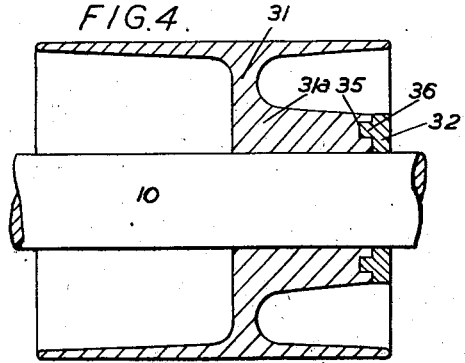
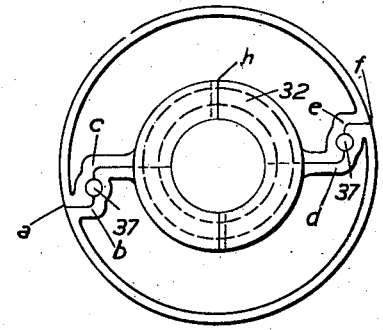
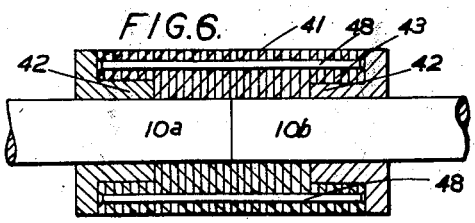
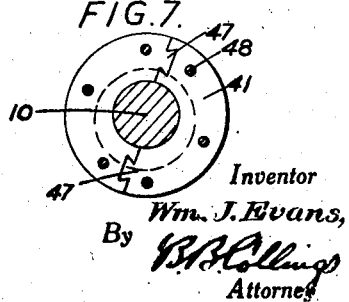
Inventor
Wm. J. Evans,
By
Attorney Dec. 18, 1945.  W. J. EVANS  2,391,302
MEANS FOR FIXING PULLEYS AND THE LIKE TO SHAFTS
Filed April 10, 1943  2 Sheets-Sheet 2
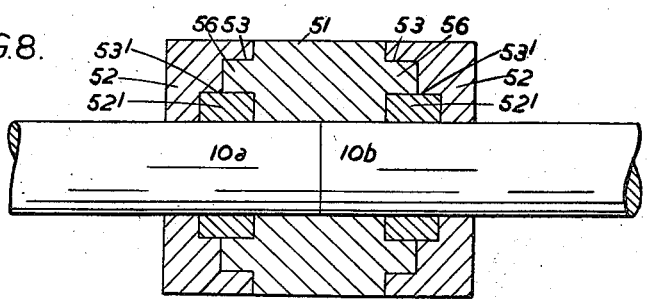
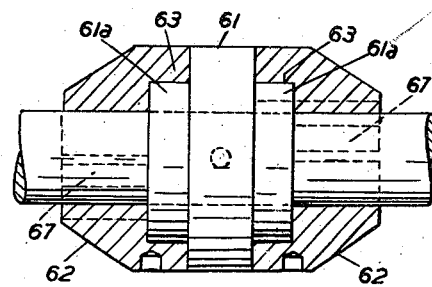 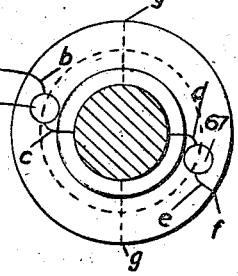
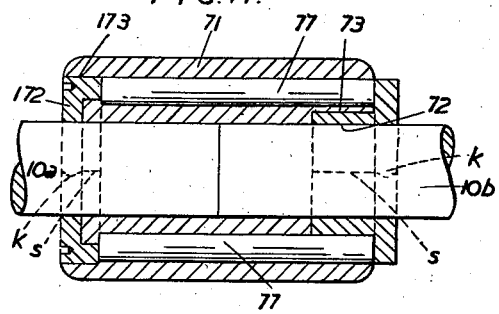 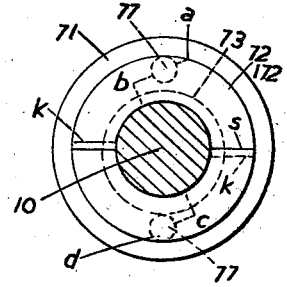
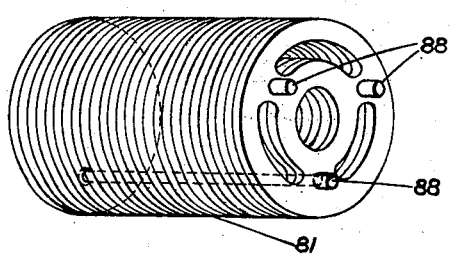 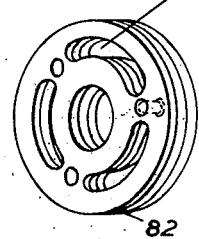
Inventor
Wm. J. Evans,
By
Attorney Patented Dec. 18, 1945

2,391,302

UNITED STATES PATENT OFFICE 2,391,302

MEANS FOR FIXING PULLEYS AND THE LIKE TO SHAFTS

William James Evans, Bulwell, Nottingham, England

Application April 10, 1943, Serial No. 482,643
In Great Britain January 10, 1942

3 Claims. (Cl. 287—52.03)

This invention is concerned with means for fixing pulleys and other encircling members to shafts against longitudinal and/or rotary motion in relation to the latter. According to this invention, a device (e. g. a pulley) provided with a bore for the reception of a shaft and being capable of being clamped to said shaft, comprises two members through each of which the bore extends and which are capable of at least partial rotation in relation to one another about the axis of the bore, and having engaging surfaces, eccentric to the axis of the bore, for throwing out of alignment upon such rotation the parts of the bore that are formed in the respective members and for thereby causing the device to clamp on the shaft. There may be more than two of the said members located side by side with the bore extending through all of them and successive members having engaging eccentric surfaces. Such a device may be utilised as a coupling for connecting together the ends of two shafts, the said shaft ends being positioned inside one of the members. Preferably but not necessarily, the engaging surfaces are cylindrical and comprise male and female eccentrics.

These and other features of the invention set out in the appended claims are incorporated in the constructions now to be described with reference to the accompanying drawings, in certain of which the devices is shown by way of example in the form of a pulley, and in which Figure 1 shows a longitudinal section, and Figure 2 an end elevation of a pulley according to this invention, Figure 3 shows a longitudinal section of a modified device, Figure 4 shows a longitudinal section, and Figure 5 an end elevation of a further construction, Figure 6 shows a longitudinal section, and Figure 7 an end elevation of a still further construction, Figure 8 is a longitudinal section showing one application of the invention to a coupling, Figure 9 is a longitudinal section, and Figure 10 an end elevation showing a split pulley, Figures 11 and 12 are similar views of a further split pulley, while Figures 13 and 14 are perspective views of two members of a pulley or the like, wherein the eccentric surfaces are not completely cylindrical.

In Figs. 1 and 2 the pulley to be clamped on the plain shaft 10 against rotary and axial movement thereon consists of two members, a main member 11 of the appropriate drum-like shape, and a second member 12. As will be seen the plain bore for the shaft 10 extends through both of these members, but the outer periphery of the member 12 is eccentric to the bore and is received in an eccentric recess 13 in one end of the member 11, the amount of eccentricity of the cylindrical outer surface of the member 12 and of the cylindrical recess 13 being indicated by the arrow X in Fig. 2. It will be appreciated that if the two members 11, 12 are rotated one in relation to the other, the eccentric surfaces will give rise to a force tending to move the shafts bore in the member 11 out of alignment with the bore in the member 12 and so the two members will lock on the shaft. Suitable means may be provided (here shown as ribs 14) on the member 12 for rotating the two members in relation to one another.

In Fig. 3 the pulley again comprises two members 21, 22 to be mounted on the shaft 10. The plain bore for the shaft 10 extends through a boss 21a on the member 21 and the said boss is provided with an eccentric recess 23 for receiving a member 22 which is formed like a sleeve with its outer periphery eccentric to the shaft bore; said member 22 is further formed with a head or flange 24 provided with flats indicated by the dotted lines 24' (e. g. of hexagonal form) to accommodate a spanner.

It will be seen that in this construction the pulley is mounted on the end of the shaft so that its rim projects beyond said end and the member 22 is located inwards of the extremity of said projecting rim.

Figs. 4 and 5 show the application of the invention to a split pulley 31, the hub 31a of which is provided with a plain bore for the shaft 10. An eccentric channel or recess 35 is formed in the end face of said hub, and a collar member 32, having a plain bore for the shaft, is formed with an annular eccentric flange or projection 36. The said collar member is positioned on the shaft 10 abutting the hub 31a, with the flange 36 of the collar received in the channel 35 of the hub, and upon relative rotation between the hub and collar, their respective bores tend to become misalined, and the pulley is thus firmly secured to the shaft. It will be seen from Fig. 5 that the joint face between the two "halves" of the members 31 has a part c, d lying in a diametral plane, parts b, c and d, e at right angles thereto so that the said parts afford faces on the two "halves" of the pulley that move over one another when the pulley is being assembled round or detached from the shaft 10, and other faces a, b and e, f which lie in tangential planes. In order to secure the two "halves" of the pulley together a longitudinal key-way is formed in each half of the pulley at the faces *b, c, d, e* for the reception of a key 37, said keys extending substantially parallel to the axis of the shaft 10.

The member 32 may be split as indicated by the line *h*; the two halves of the said member 32 are held together because of the reception of the projection 36 in the recess 35.

Fig. 6 shows that the one member 41 of the pulley may be built up from a series of plates or laminations held together by means such as rivets 46. These laminations may be split as shown in Fig. 7, the two "halves" being secured together around the shaft by means such as the dove-tails 47. An eccentric member 42 is received within an eccentric recess 43 at least at one end of the member 41, the shaft bore extending through both members 41, 42.

Fig. 6 also illustrates that a device consisting of a member 41 with an eccentric member 42 at each end of it may serve as a coupling to connect together two shaft ends indicated at 10a, 10b. The extremities of the two shafts are located within the member 41, while one eccentric 42 surrounds one shaft and the other eccentric 42 surrounds the other shaft. It will be appreciated that by rotating each of the members 42 in relation to the member 41 each of the two shafts 10a, 10b is clamped within the device and the two shafts are therefore coupled together in axial alignment.

Another coupling is shown in Fig. 8. There is a central member 51 within which the ends of the shafts 10a, 10b are located and provided at each end face with an eccentric projecting rim 56. The two end members 52 are formed with eccentric recesses 53 to accommodate the said members 56 so that said members 52 resemble end caps. If desired a collar 52' having its outer surface eccentric may fit around each shaft within the eccentric interior of projection 56 and corresponding eccentric recesses 53' in said members 52.

Figs. 9 and 10 show a further construction of split pulley. The central member 61 is split diametrically as indicated by the dotted line *g—g* in Fig. 10 and is provided at each end face with an eccentric boss such as 61a. The end members 62 have their end faces formed to accommodate the eccentrics 61a, as for example being provided with female eccentrics 63 so that by rotating said members 62 in opposite directions the device may be locked on the shaft. Each of the members 62 is also split on a joint face shown at *a, b, c, d, e, f* in Fig. 10, the portions *b, c* and *d, e* of said joint face being provided with keyways for the reception of keys 67 whereby the two "halves" are connected together around the shaft 10.

In the construction shown in Figs. 11 and 12, the member 71 is split on the joint face *a, b, c, d* said joint face having a part *b, c* in a diametral plane and parts *a, b* and *c, d* at right angles thereto, the said parts *a, b* and *c, d* providing faces on the two "halves" of the device that move over one another when the two "halves" are being assembled around or removed from the shafts 10a, 10b. These said faces are cut with key ways for the reception of keys 77. An eccentric member is provided at least at one end of member 71. By way of example two eccentric members 72 and 172 of different shapes are shown, the said eccentric members being received in eccentric bores 73 and 173 respectively. Each said member 72 or 172 is split into two "halves," the split being indicated by the dotted lines *s* in Figs. 11 and 12. The two "halves" of each member 72, 172 are held against separation because of their reception within the member 71. It is desirable, however, that relative axial movement between the two "halves" of member 72 or 172 shall be prevented, and for this reason they are connected together at the joint face by means of an integral key *k*.

In the construction shown in Figs. 13 and 14 the eccentric surfaces connecting the two members 81, 82 are not completely cylindrical. The member 82 is formed with a suitable number of arcuate slots 89 each of which is eccentric to the shaft bore. Pins 88 projecting from the end face of the other member 81 fit in these slots 89, said pins being likewise eccentric to the bore. Each of the members 81 and 82 may be formed by laminations as shown and the pins 88 may constitute the ends of rivets holding the laminations of member 81 together. This construction permits all the laminations constituting both members 81, 82, to be identical.

If a quick clamping and release movement is required, each member may be provided with a projection that may be struck by a hammer.

Although the invention has been described with particular reference to pulleys and couplings it will be appreciated that it is not limited in its application and may with advantage be applied to other members such as cams and wheels.

I claim:

1. A readily mountable and demountable pulley, shaft coupling or like device, comprising a member having an eccentric element, and a plain bore for the reception of a shaft, said member being split longitudinally into parts having opposed complemental faces within the periphery of the member; a second member having a bore for the shaft, and an eccentric element mating with said first named eccentric element, whereby relative rotation between the two members tends to produce misalinement of their respective bores which firmly secures the device to the shaft; and means co-acting with said complemental faces of the first member for preventing separating movement of the parts of such member transversely of the shaft.

2. A readily mountable and demountable pulley, shaft coupling or like device, comprising a member having a plain bore for the reception of a shaft, said member being split longitudinally into parts having opposed complemental faces within the periphery of the member, portions of said faces being disposed in substantially a diametric plane of the member and other portions of said faces extending at substantially right angles to said diametric portions; eccentric means for locking said member to the shaft; and means engageable with said angularly disposed portions of the complemental faces of said member parts, for preventing separation of the parts transversely of the shaft.

3. A device according to claim 2, wherein the angularly disposed portions of the complemental faces of the member parts are provided with mating longitudinal keyways, there being keys disposed therein to prevent the transverse separation of the parts.

WILLIAM JAMES EVANS.